United States Patent [19]
Stewart

[11] 3,807,630
[45] Apr. 30, 1974

[54] AVERAGING CIRCUIT SUITABLE FOR CENTRIFUGAL TYPE CHEMICAL ANALYZER

[75] Inventor: Marvin C. Stewart, Hempstead, N.Y.

[73] Assignee: Union Carbide Corporation, New York, N.Y.

[22] Filed: May 31, 1972

[21] Appl. No.: 258,294

[52] U.S. Cl. ................ 235/156, 235/151.3, 235/183
[51] Int. Cl. ......................... G06f 7/385, G06f 15/34
[58] Field of Search ....... 235/151.3, 151.13, 150.51, 235/183, 151.35, 156

[56] References Cited

UNITED STATES PATENTS

| | | | |
|---|---|---|---|
| 3,182,181 | 5/1965 | Schumann | 235/156 X |
| 3,192,371 | 6/1965 | Brahm | 235/150.51 X |
| 3,446,949 | 5/1969 | Trimble | 235/156 X |
| 3,562,500 | 2/1971 | Grant | 235/151.3 |
| 3,566,092 | 2/1971 | Grant et al. | 235/151.35 X |

*Primary Examiner*—Felix D. Gruber
*Assistant Examiner*—James F. Gottman
*Attorney, Agent, or Firm*—Fredrick J. McCarthy, Jr.

[57] ABSTRACT

An averaging circuit arrangement for providing the average of a repeated sequence of a plurality of binary signals comprising a combination of a serial storage binary counter and adding device.

2 Claims, 11 Drawing Figures

AVERAGING CIRCUIT SUITABLE FOR CENTRIFUGAL TYPE CHEMICAL ANALYZER

The present invention is directed to a circuit for use in averaging electronic signals. More particularly the present invention is directed to a circuit for providing a digital output signal which is the average of a plurality of analog input signals.

In various electronic measuring devices, an analog electrical signal is developed which is intended to be proportional to a particular parameter, e.g. temperature, light intensity etc. and this signal is converted to digital form and ultimately a numerical "read out". Under some circumstances, random "noise" signals can distort the analog signal thus leading to error when the analog signal is converted to digital form. The random "noise" distortion can be alleviated by averaging a plurality of the distorted analog signals. The averaging of the analog signals however requires the use of additional expensive analog devices and careful shielding so that random "noise" does not also affect the added analog components.

It is therefore an object of the present invention to provide a circuit which provides for the averaging of digital signals corresponding to a plurality of analog signals subject to random distortion.

Other objects will be apparent from the following description and claims taken in conjunction with the drawing wherein FIG. 1 illustrates schematically in block diagram form the averaging circuit arrangement of the present invention in combination with a centrifugal-type chemical analyzer.

Figure 1:
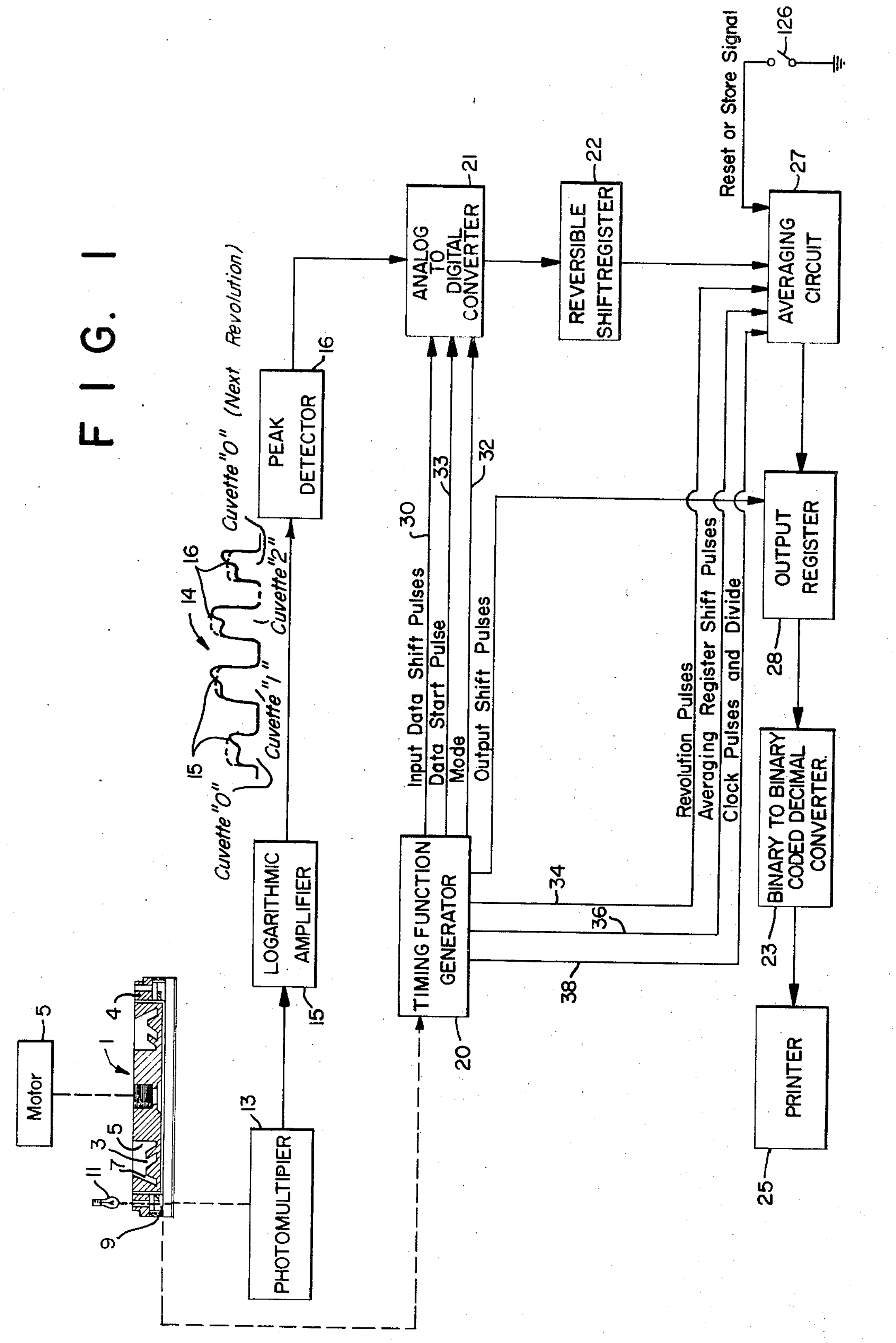
FIG. 1a illustrates schematically in block diagram form a particular averaging circuit arrangment in accordance with the present invention.
Figure 1A:
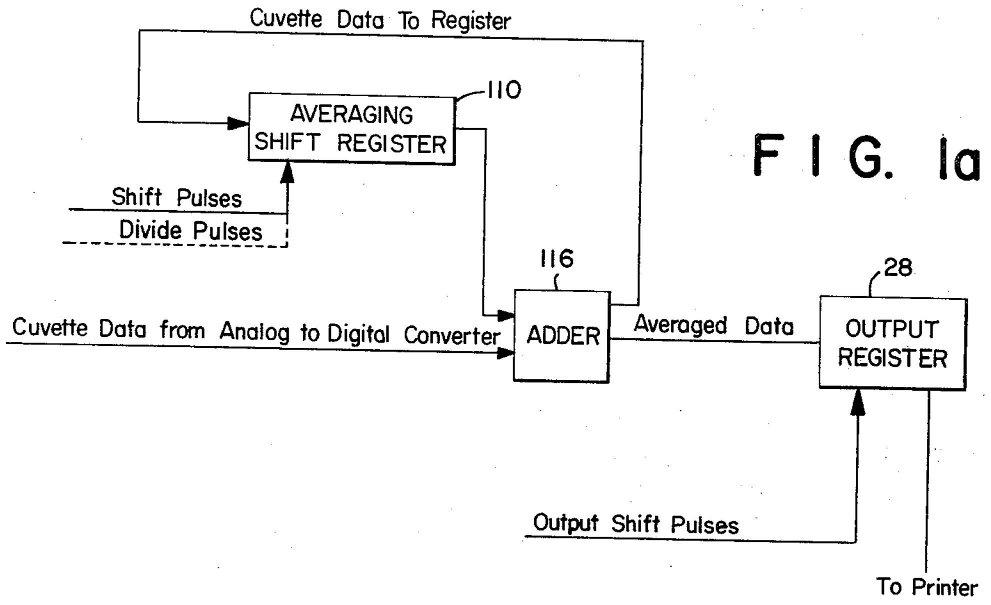

With reference to the drawing, FIG. 1 shows schematically a block diagram arrangement for obtaining light absorbance data for a centrifugal type analyzer. In FIG. 1, rotatable disc 1, for example suitably made of Teflon* (*Trademark of E.I. Dupont De Nemours) is shown having cavities 3 and 5 from which a liquid sample, i.e. blood serum, and a liquid reagent, are caused by centrifugal force, upon rotation of the rotatable disc 1, to pass into chamber 7 and mix and react in the communicating cuvette 9. A plurality of such cavity arrangements, e.g. thirty, conveniently numbered "0" to "29" is provided around the rotatable disc 1 and communicate respectively with a plurality of radially aligned cuvettes 9 located in a ring member 4 and indexed with and affixed to the rotatable disc 1. The extent of the reaction in the plurality of cuvettes 9 is measured photometrically through the use of a light source 11 and a conventional photomultiplier detector 13 which supplies a repeated sequence of analog signals related to the light absorbance, i.e. the optical density of the liquid in the respective transparent cuvettes 9, to amplifier 15. Amplifier 15 is conveniently a logarithmic amplifier such as Philbrick Model 4351. The amplified analog signals, indicated at 14 in FIG. 1, are conventionally converted to peak analog signals, using for example a peak detector 16 which can be a Peak Detector Module 4.84/25 available from Burr-Brown Research Corporation. The resulting analog signals are transmitted to a conventional analog-to-digital converter 21, e.g. a commercially available Fairchild Model 3751 for conversion to corresponding binary digital signals which are ultimately converted to a decimal coded form in a conventional Binary-to-Binary Coded Decimal Converter arrangement 23. The output of BCD converter 23 is applied to a conventional printer 25, for example a Moduprint Mode A available from Practical Automation, Inc., to provide a numerical "read out" corresponding to the input analog signal 14. As shown in FIG. 1, analog signals 14 are distorted by random "noise" indicated at 15 which can arise from, for example, A.C. power line variations. The distortion of the peaks of signals 14 can lead to randomly erroneous conversion of signals 14 to digital signals in analog-to-digital converter 21. The effect of the distortion in analog signal 14 is alleviated in the present invention through the use of the averaging circuit indicated generally at 27. The general operation of the averaging circuit of the present invention, with reference to FIGS. 1 and 1a, involves the averaging of a plurality of analog data signals, such as indicated at 14, for each of the cuvettes 9 (e.g. thirty, conveniently numbered "0" to "29"). That is a plurality of data signals, e.g. eight (over eight revolutions of disc 1) for each cuvette 9 are to be averaged. Timing function generator 20, of conventional design, including for example counters, shift registers, and combinatorial gating is synchronized with rotatable disc 1 and provides to analog-to-digital converter 21 synchronized signals (as hereinafter more fully described in connection with FIGS. 3 and 3a). These signals include input data shift pulses via connector 30, and a mode pulse via connector 32, data start pulses via 33. Timing function generator 20 also provides a synchronized "revolution pulse" (i.e. one pulse per revolution of rotatable disc 1) via 34 to averaging circuit 20 and also synchronized "divide" pulses via 36 and averaging register shift pulses via 38.

Figure 4:
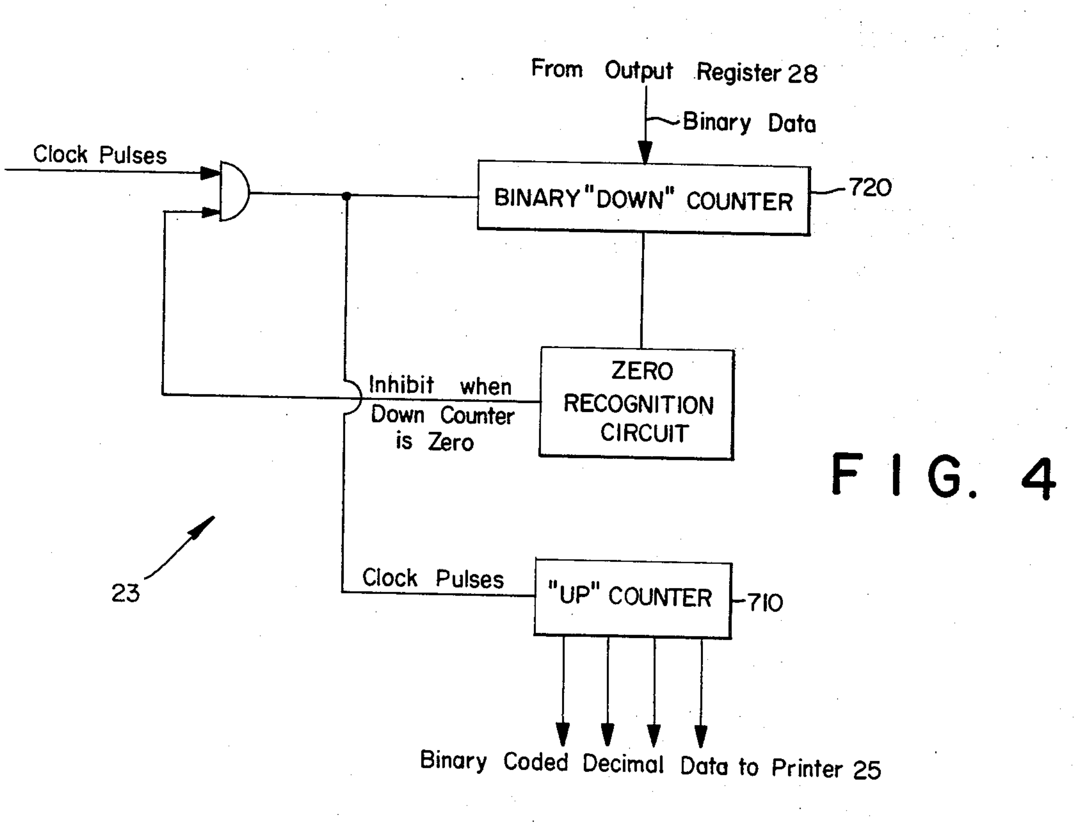
FIG. 4 shows schematically in block diagram form a conventional binary to binary-coded-decimal converter arrangement which can be used in connection with the averaging circuit arrangement of the present invention.
Figure 3:
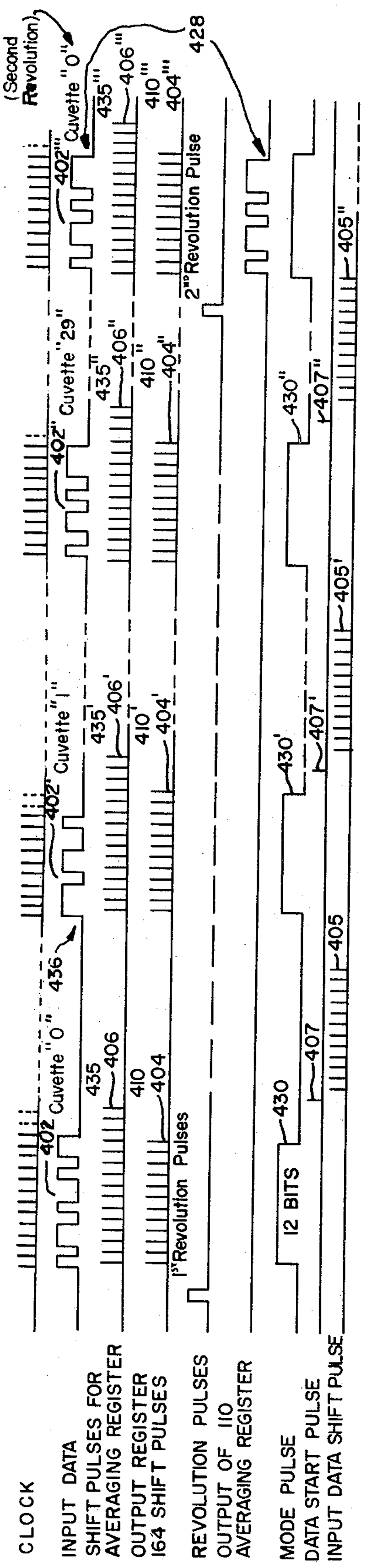
FIG. 3 is a time diagram illustrating the pulses and signals which occur in the operation of the averaging circuit of FIG. 2 in accordance with the present invention.
Figure 3A:
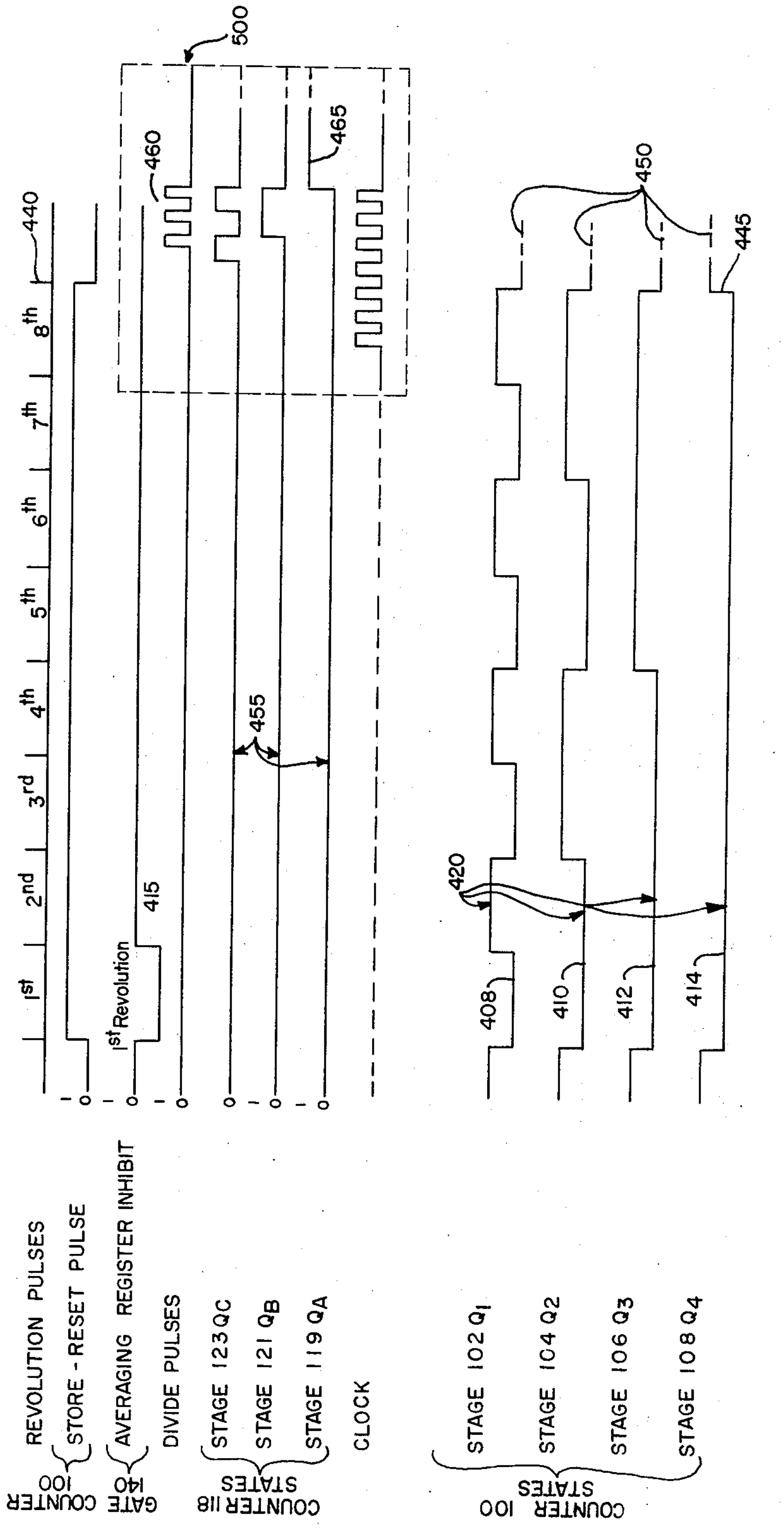
FIG. 3a is a time diagram illustrating certain pulses and signals which occur in the operation of the averaging circuit of FIG. 2 for a longer time period than that illustrated in FIG. 3.
Figure 5:
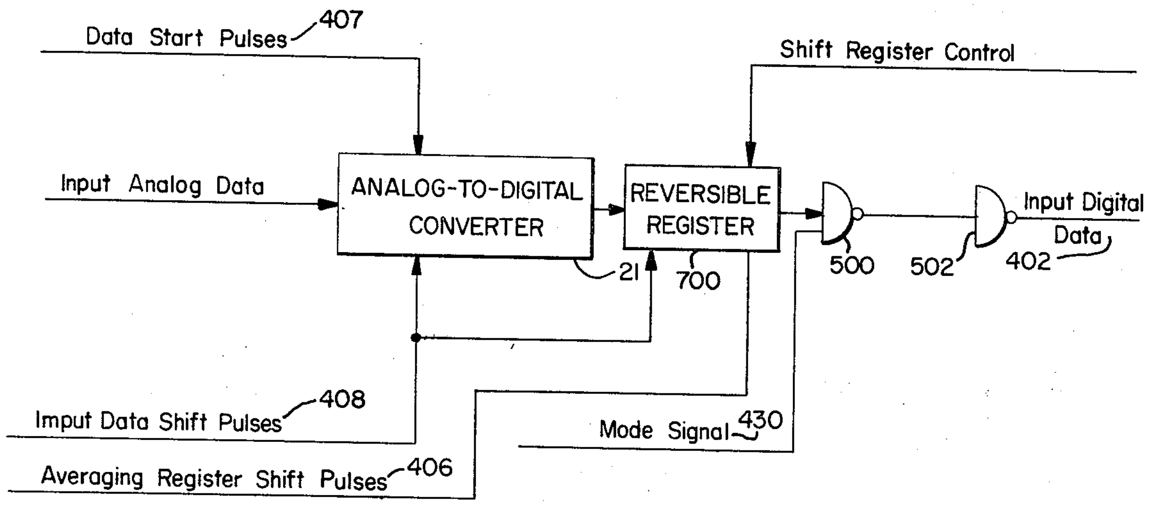
FIG. 5 illustrates a conventional analog-to-digital converter arrangement which can be used in connection with the present invention.

In operation, and with reference to FIGS. 1, 1a, 3, 4 and 5 in particular, a data start pulse, one for each cuvette 9 in disc 1, is applied from timing function generator 20 to analog-to-digital converter 21 as shown in FIG. 5. This institutes a conversion cycle in the A/D converter so that the input analog data is converted and stepped in, e.g., 15 bit words for each pulse 14 of analog data into reversible register 700, which can be a commercially available arrangement comprising for example, Three "4 bit" Texas Instrument SN7495N units. The reversible register 700 is shifted appropriately by averaging register shift pulses from timing function generator 20. This pulse signal and the other pulses and signals mentioned herein are illustrated in FIGS. 3 and 3a. The reversible register 700 provides a least significant bit (LSB) output through the gate-inverter arrangement 500 and 502 whereby digital signals in binary form as "words" pass into averaging circuit 27 for a predetermined number of revolutions of rotatable disc 1 (e.g. eight revolutions), as determined by the revolution pulses applied to the averaging circuit 27 via 34. The mode signal applied at gate 500 determines the bit size of the words as hereinafter more fully described. Each word comprises a predetermined number of bits and each word is the binary number corresponding to the value of the analog signals serially derived for each of the cuvettes 9 (e.g. thirty) which pass between light source 9 and photomultiplier detector 13. Each word passing into averaging circuit 27 is transferred through an adding device 116 into a shift register 110 wherein the data is shifted by averaging register shift pulses applied via 38. The shift register 110 can also be any serial storage device such as a delay, line, magnetic drum memory and the like. The output of the shift register 110 in the averaging circuit 27 is applied to the adding device 116 in a time relationship such that the word for each cuvette 9 is added to the next word for the same cuvette (i.e. the word resulting from the next revolution) and the sum transferred to the shift register 110. At the completion of the predetermined number of revolutions (e.g. eight), as indicated by the revolution pulses via 34, no further data is transferred to the averaging circuit 27, which now contains in shift register 110 the summed data for each cuvette 9 (e.g. 30) for the predetermined revolutions, (e.g. eight). The application of "divide pulses" via 36 to the shift register 110 of averaging circuit 27, by which a division is obtained in the shift register (e.g. division by eight) provides the divided or averaged word sums in binary word at the output of averaging shift register 110 from which the averaged words can be transferred to output register 28 by shift pulses via 33. The binary data from output register 28 is conventionally processed through BCD converter 23 and printer 25 to obtain a mumerical "read out" corresponding to the average value of the analog signal derived for each cuvette 9. A conventional arrangement for BCD converter 23 is shown in FIG. 4 and described in my co-pending application entitled "Calibration Circuit Suitable For Centrifugal Type Chemical Analyzer" which is incorporated. In operation the binary data from output shift register 28 is counted up in conventional up counter 710 while down counter 720 counts down to zero. The states of the stages of up counter 710 are applied to a conventional printer arrangement 25.

Figure 2:
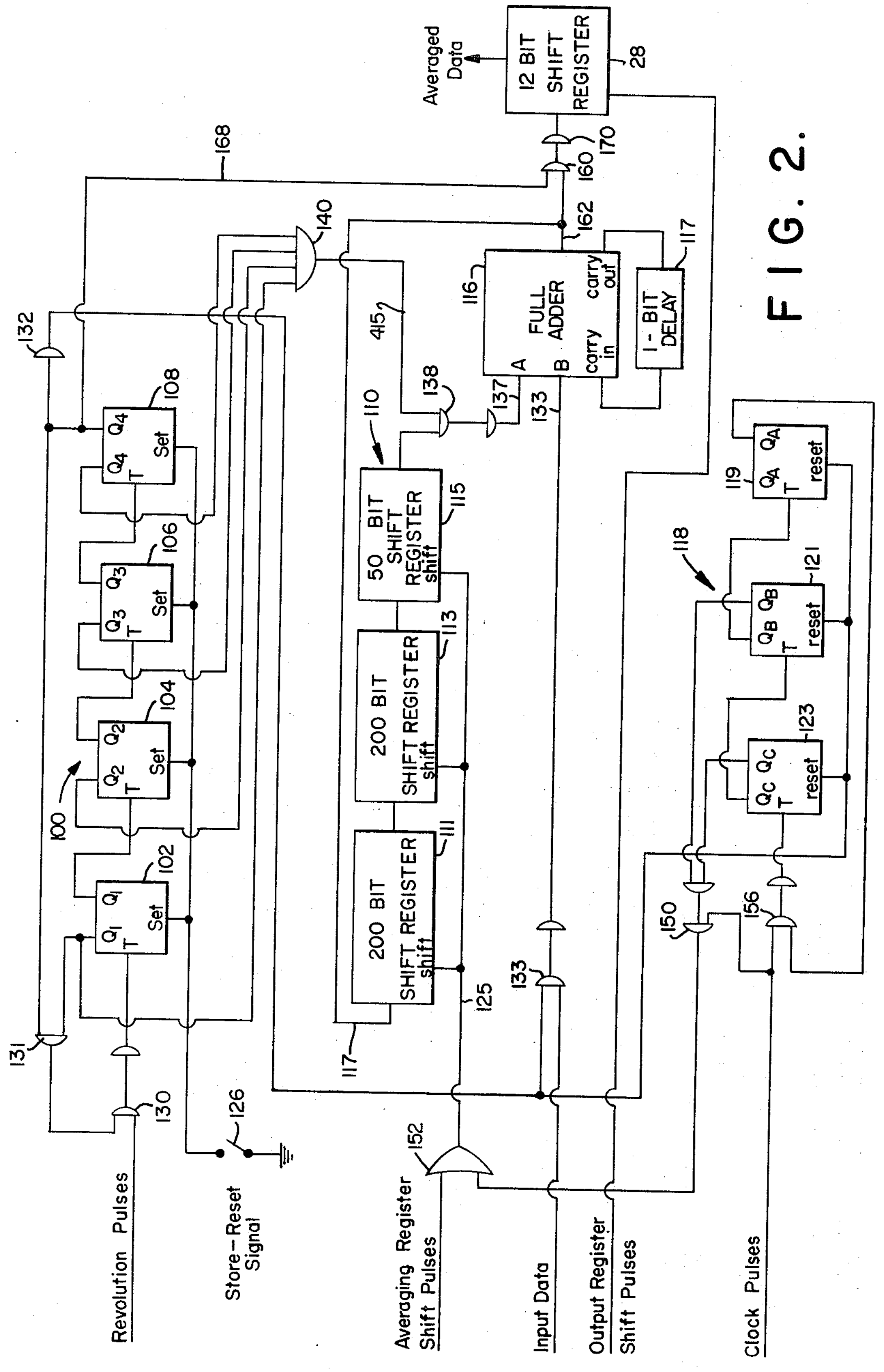
FIG. 2 illustrates schematically a specific averging circuit in accordance with the present invention.

The present invention will be more fully understood with reference to FIG. 2 which schematically illustrates a particular embodiment of the present invention.

With reference to FIG. 2, a conventional four stage counter is indicated at 100 comprising for example, four conventional triggerable bistable multivibrators 102, 104, 106 and 108. A conventional shift register of 450 bit capacity is indicated at 110 comprising, in cascade, 200 bit register 111, 200 bit register 113 and 50 bit register 115. These units can be arranged from commercially available devices such as Signetics Models S2004 and S2005. The reason for this exemplary selection of register capacity is hereinafter more fully explained. Also shown in FIG. 2 is a conventional full adder 116 with the conventional 1-bit delay arrangement 117, and a conventional three stage binary counter 118 comprising for example, three conventional triggerable, bistable multivibrators 119, 121, and 123.

In operation, with reference to FIG. 2 and the time diagrams of FIGS. 3 and 3a, switch 126 is closed to provide a DC set condition signal to all stages 102, 104 and 106 and 108 of counter 100. This signal is referred to herein as the "store-reset" signal. In the "set" (or reset) condition all stages of counter 100 are in the "1" state. Revolution pulses (one for each revolution of rotatable disc 1) are applied under these conditions to counter 100 via gate 130; however the output of the counter is zero via gate 132. The revolution pulses applied to the counter 100 do not affect the all "1" condition in the counter since all stages remain clamped to "ground" via switch 126. Upon opening of switch 126 however, the next revolution pulse applied to counter 100 steps the counter to the all "0" condition. this revolution pulse is indicated at 400 in FIGS. 3 and 3a and the states of counter 100 are shown at 408, 410, 412, and 414 in FIG. 3a. As a result, the signal at Q4 of the counter stage 108 passes via gate 132 and "opens" gate 130 to admit the cuvette data from analog-to-digital converter 21 to the averaging circuit. The output of analog-to-digital converter 21 is continuous with the application of Data Start Pulses indicated at 407 in FIG. 3. The input data is stepped by input data shift pulses 405 shown in FIG. 3. The data from analog-to-digital converter 21, indicated at 402 in FIG. 3, initiated by a data start pulse prior to the pulse indicated at 407 in FIG. 3 is in binary form comprising a "word" for each analog signal received, which occurs when each cuvette 9 passes between light source 11 and photo-multiplier detector 13. Thus a sequence of 30 words will be generated serially for each revolution of a 30 cuvette disc. The number of bits per word is selected on the basis of the precision desired in the ultimate numerical readout. For rotating analyzers of the type referred to herein, a twelve bit word is adequate and an analog-to-digital converter providing "twelve bit" words for each analog signal can be used, (e.g. a Fairchild Model 3751) and will be employed by way of example.

Figure 8:
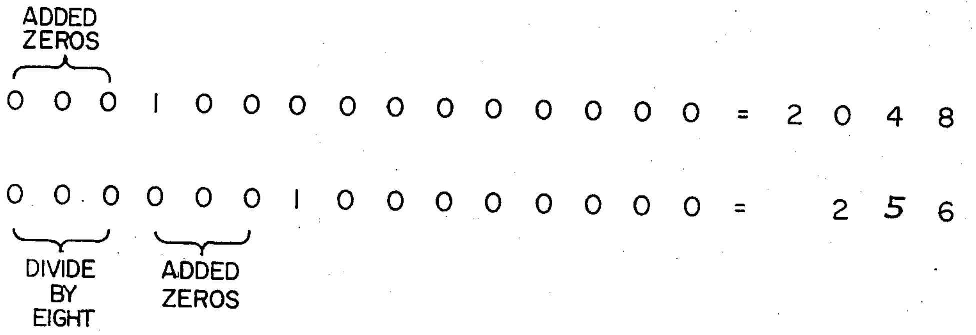
FIG. 7 illustrates schematically a combination of a centrifugal type chemical analyzer in combination with a particular averaging circuit arrangement in accordance with the present invention and FIG. 8 illustrates numerically a particular averaging in accordance with the present invention.

The binary data from analog-to-digital converter 21, i.e. sequences of thirty, serial, 12 bit words per revolution of rotatable disc 1, passes into full adder 116 at 133, one "bit" being passed for each of the twelve input data shift pulses indicated at 405 which are applied to analog-to-digital converter 21. These pulses 14 applied at analog-to-digital converter 21 are stepped by input data shift pulses 405 and shifted into the averaging circuit by averaging register shift pulses shown at 406 in FIG. 3. The output of adder 116 is applied to the input of averaging shift register 110 at 117 concurrently with the application of fifteen shift pulses 406 (FIG. 3) to register 110 at 125. Consequently each "bit" applied to the adder 116 at 133 (added to whatever signal is then applied at 137) is transferred into register 110 and shifted. During the period of the first revolution of rotatable disc 1, i.e. the first thirty words of data, NAND gate 140, by virtue of the signals applied from stages 102, 104, 106 and 108 of counter 100, indicated at 408, 410, 412 and 414 in FIG. 3a provides a signal at 415 which closes gate 138 and inhibits any signal from shift register 110 from passing to adder 116. This in effect allows any previous data in register 110 to be erased by being "shifted out" of the register but not added since gate 138 is closed. After one revolution of rotatable disc 1, NAND gate 140 will "open" due to the non-similarity of the outputs from stages 102, 104, 106 and 108 as shown at 420 in FIG. 3a. To permit ultimate averaging of the data for each of the thirty cuvettes 9, it is required that the output from register 110 applied to the adder 116 at 137 be coincident with the incoming data to the adder at 133. That is the previous "word" for a given cuvette must be " shifted out" of register 110 in coincidence with the incoming "word" for the same cuvette. This condition is represented at 428 in FIG. 3. This is accomplished in the exemplary arrangement hereindescribed by selecting shift register 110 to have a bit capacity of 450 bits. This particular "bit capacity" is based on the availability of "12 bit" words from the selected analog-to-digital converter 21. Since thirty, 12 bit words are provided for each revolution and it being desired to average for eight revolutions, a total bit capacity of 450 could be required if the numbers involved in the data for each cuvette range as high as 4095 in binary value. This is a practical selection since absorbance unit measurements for centrifugal type analyzers fall in this range, e.g. up to 4095. A 450 bit capacity is therefore employed for register 110. (If a "ten bit" word were considered satisfactory then 1024 would be the maximum value. The. for eight revolutions and thirty cuvettes, the register capacity would be 390 bits). The selected full capacity (450 bits) of the register thus corresponds to thirty, 15 bit words for eight revolutions. That is the register will be full and start to "shift out" the first word entered (i.e. the word from cuvette "0" for the first revolution of rotatable disc 1) after receiving 450 bits. This "shifting out" of the first word to the input at 137 of adder 116 is required to be coincident with the "first word" of the data for the second revolution of cuvette 9, i.e. the data for the first cuvette "0" which appears at 133. This is accomplished by ensuring that the "12 bit" words from the analog-to-digital converter 21 are counted as "15 bit" words in register 110 without changing the value of the words. This can be readily accomplished by applying the output of analog-to-digital converter 21 via reversing register 700. together with a mode signal indicated at 430 in FIG. 3 through a NAND gate 500 and inverter 502 as illustrated schematically in FIG. 5 and hereinbefore discussed. With reference to FIG. 5, the mode signal indicated also at 430 in the time diagram of FIG. 3, when high (one), and when the output of analog-to-digital converter 21 is high (one), an output signal appears via inverter 502. When the mode signal 408 is low (zero) then a zero output signal appears via inverter 502. The mode pulse is 12 bits wide (12 clock pulses) wide. Thus each 12 bit word from analog-to-digital converter 21 has "zeros" added to it, as indicated at 435 in FIG. 3, which do not affect its value, for the next three shift pulses to register 110 indicated at 410. Zeros actually are provided until the next word input as indicated at 436 but this does not affect the data. Thus 15 bits are transferred to counter 110 for each word from the analog-to-digital converter 21. Consequently, counter 110 will be filled after thirty words resulting from the first revolution, or sequence, and an output corresponding to the first word introduced will appear at 137 and will be added with the coincident input at 133 corresponding to the first word for the second revolution, or sequence, of rotatable disc 1. This is shown at 428 in FIG. 3 as previously noted. This operation continues for eight revolutions providing for the successive addition of eight sets of data for each cuvette "0" to "29". On the ninth revolution pulse counted by counter 100, indicating the completion of eight revolutions and shown at 440 in FIG. 3a, $Q_4$ of counter stage 108 becomes a "one" as shown at 445 in FIG. 3a and the signal at gate 132 inhibits the input of any further data via gate 130. Also, the counting of counter 100 is stopped with a signal via gate 131. The counter 100 is thereby placed in condition for the next averaging cycle, i.e. the counter is in a "0001" state as shown at 450 in FIG. 3a. On application and removal of the next "store-reset" signal, by actuation and release of switch 126, the counter 100 will be appropriately synchronized with the next subsequent revolution pulse. With the signal from gate 132 removed after the ninth revolution pulse, counter 118, which had previously been held in an "all zero" condition by this signal, indicated at 455 in FIG. 3a, is stepped by the clock pulses applied at gate 156. After the first clock pulse, the counter states of counter 118 allow three successive clock pulses, indicated at 460 in FIG. 3a, to be applied as shift pulses to shift register 110 via gates 150 and 152. After these pulses, stage 119 become a "one" as indicated at 465 in FIG. 3a and its signal at Q4 inhibits gate 156 and any further counting of the counter 118. It will be noted that the pulses illustrated in the dotted portion 500 of FIG. 3a have been expanded for purposes of clarity. The three shift pulses 460 applied to register 110 effectively divides the binary data in register 110 by eight. This occurs since the input at 133 of adder 116 is zero, with gate 130 inhibited to data from analog-to-digital converter 21, and this "zero" is added to the least significant bit (LSB) at the output of register 110. When this happens three times the effect is a division by eight as indicated in FIG. 8 which illustrates an exemplary division by eight of the binary value 2048 by shifting three places. While the input data is being applied through adder 116 to register 110, gate 160 prevents the output at 162 of adder 116 from reaching output register 164, which is a 12 bit shift register (and can be commercially available as before described). With the signal from Q4 of stage 108 of counter 100 at "one" a signal via 168 opens gate 160. The output of register 110 thus appears at the output of inverter 170 (the input at 133 of adder 116 is zero) and passes into output register 28. Output shift register pulses in groups of 12 indicated at 404 in FIG. 3 are applied to the output shift register 28. The first twelve shift pulses, which are coincident with the first twelve pulses of averaging register shift pulses 406, transfers the first averaged word, correspond to the first cuvette data from the output register to BCD converter 23 and to printer 25 where a "readout" is obtained. Each succeeding twelve shift pulses 404 etc., transfers another averaged word until the averaged data for all thirty cuvettes is obtained.

The above description was specific to the averaging of eight sets of data. An average of 2, 4, 8, 16, 32, etc., sets of data can be readily obtained by routine modification of the circuit of FIG. 2 following the principles set forth above. By way of example, to average sixteen sets of data, four extra shift pulses 460, instead of three are provided, when all the data has been accumulated in register 110. Also, counter 110 should remain "on" for sixteen revolutions. This can be accomplished by adding one additional stage to counter 100. Also, for the conditions of thirty cuvettes and sicteen revolutions with 12 bit words, the capacity of register 110 should be 16 × 30 = 480 bits (for measured values up to 4095). To average four sets of data, two extra shift pulses 460, instead of three, are provided. Also, counter 100 should remain "on" for four revolutions, by removing one stage from counter 100. The corresponding bit capacity of register 110 should be 420.

Similarly, averages for the other indicated sets can be obtained.

Figure 6A:
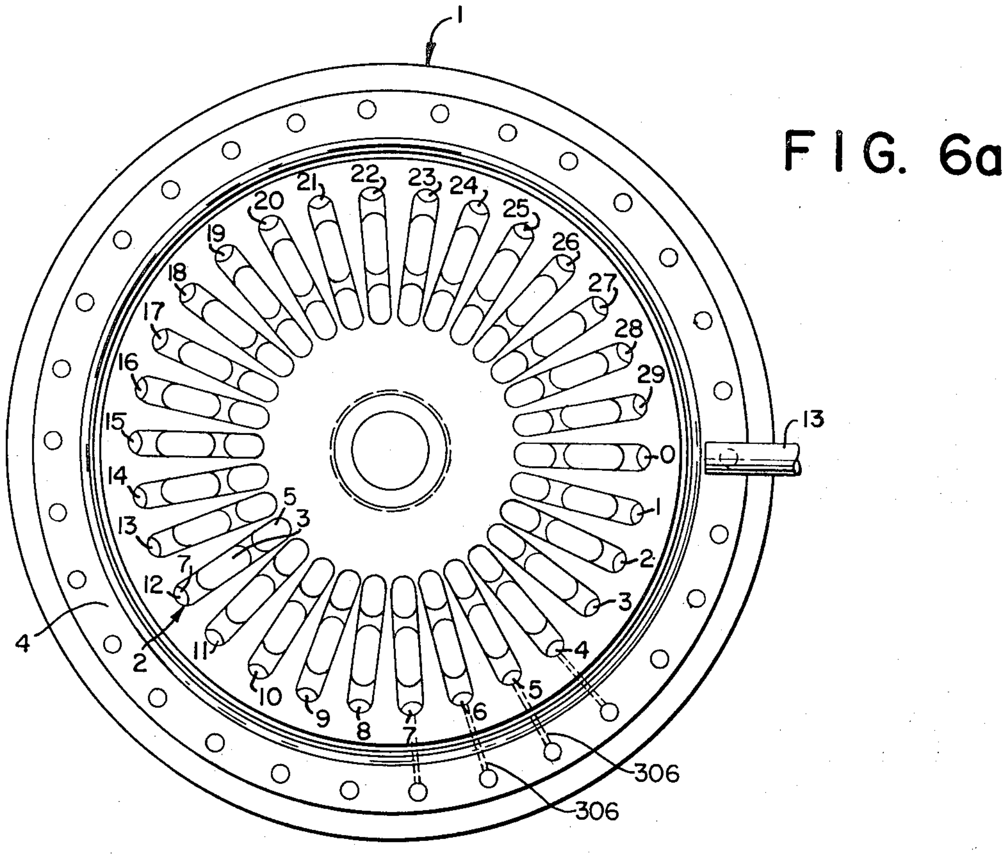
FIGS. 6 and 6a illustrate a centrifugal type chemical analyzer for use in combination with the averaging circuit of the present invention.
Figure 6:
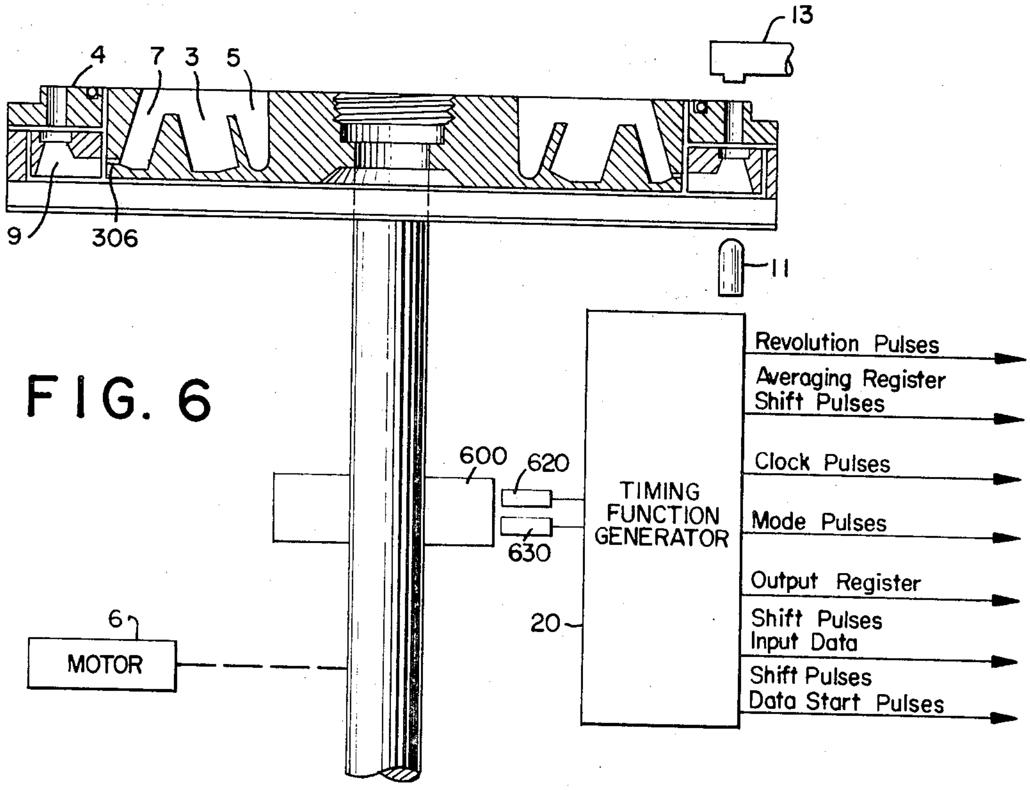
Figure 7:
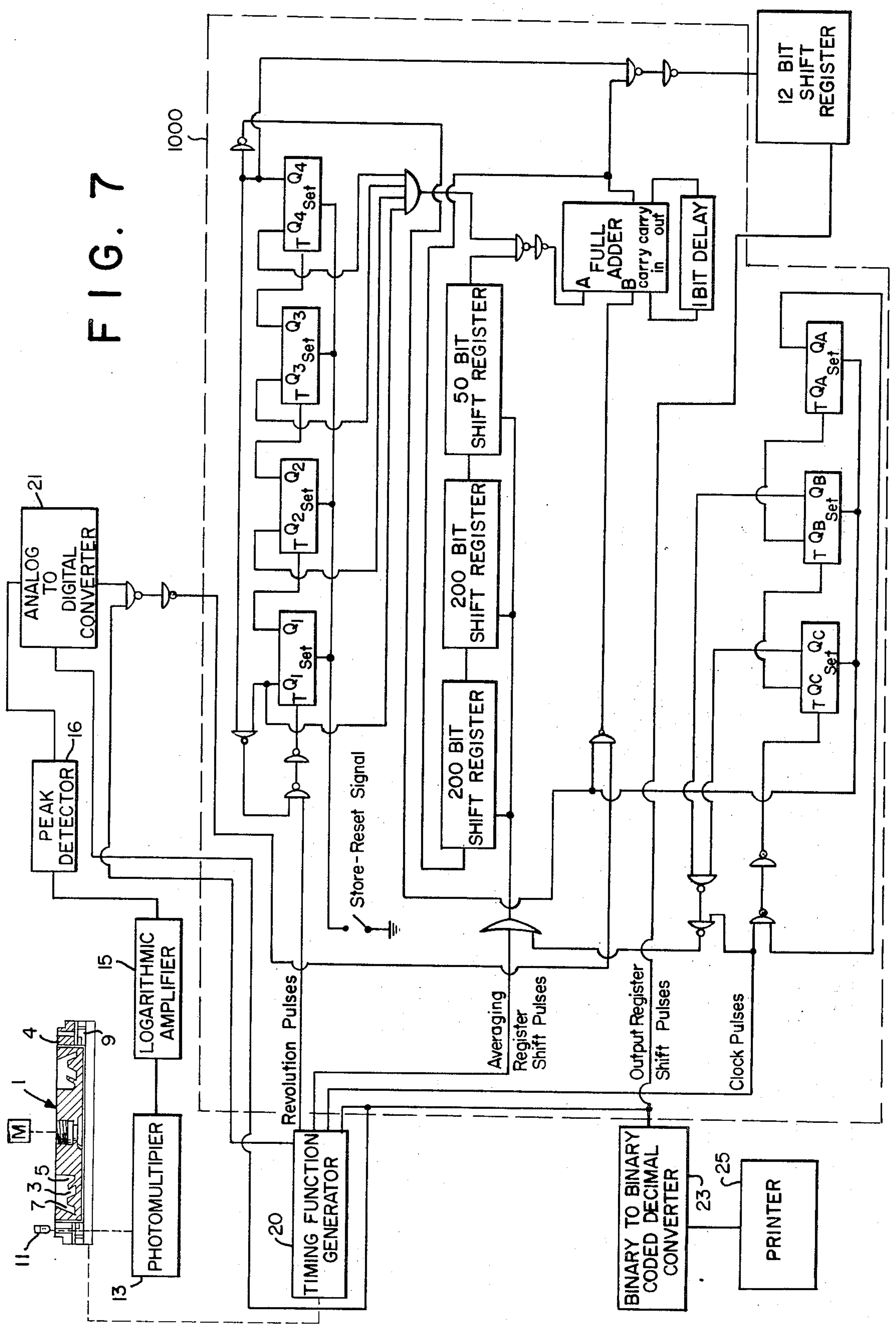

A further embodiment of the present invention is represented in FIG. 7 for use in connection with the analyzer shown in FIGS. 6 and 6a. The analyzer shown in FIGS. 6 and 6a of the type previously mentioned, comprises a rotatable loading disc 1 containing 30 rows of cavities indicated at 2 and numbered from "0" to "29", each row having a serum cavity 3, a reagent cavity 5, and a mixing chamber 7. Each row of cavities 302 is respectively aligned with a cuvette in ring member 4. When the ring member 4 is driven, by motor 6, mixed serum and reagent are transferred through channels 306 to the respective cuvettes 9. The filled cuvettes 9 rotate rapidly between light source 11 and a conventional photomultiplier unit 13, e.g. at 1000 RPM and provide a sequence of analog electrical signals in the form of pulses, such as indicated at 14 in FIG. 1 to a conventional amplifier, e.g. a logarithmic amplifier 15. Thirty serial pulses are provided for each revolution of rotatable disc 1. The signals applied to the amplifier 15 are in the form of pulses due to the chopping effect of the rotation of cuvettes 9 between light source 11 and photomultiplier detector 13. A logarithmic amplifier is desirable due to the inherent logarithmic character of the absorbance phenomenon of serum-reagent reactions. The amplitude of the pulses applied to the amplifier 15, and the amplified pulses, are a measure of the light absorbance, i.e. optical density of the liquid in the cuvettes 9, and hence a measure of the state of reaction in the cuvettes 9. These pulses, subject to random distortion as shown at 14 in FIG. 1, are applied via a conventional peak detector 16 to a conventional analog-to-digital converter 21 as previously mentioned in connection with the embodiments of FIGS. 1 and 2. The output of analog-to-digital converter 21 is a sequence of thirty serial, binary words for each revolution of rotatable disc 1, with each word corresponding to the measured optical density of the reacting liquids in each cuvette 9. A calibration circuit as described in my copending application Serial No. 258,258, filed May 31, 1972, entitled "Calibration Circuit Suitable for Centrifugal Type Chemical Analyzer" can be used to precisely conform the binary words to the appropriate optical density numerical value. As previously mentioned in connection with FIGS. 1 and 2, the data for each cuvette can be averaged for a predetermined number of revolutions, e.g. eight.

As shown in FIG. 6, a magnetic disc 600 of conventional design is affixed to shaft 610 of rotor assembly 4, which is driven at a predetermined speed e.g. 1000 RPM by motor 5. Magnetic disc 600 can be routinely designed to have an incrementally, magnetically polarized surface whereby a plurality of uniformly spaced in time magnetic pulses are delivered to a conventional magnetic head detector 620. The magnetic pulses develop electrical pulses in magnetic head 620 which are applied to timing function generator 20. By well known techniques and using conventional circuitry the synchronized signals previously described are provided, i.e. clock pulses, shift pulses and mode pulses. In a similar manner magnetic head 630 receives a magnetic pulse once each revolution of rotatable disc 1 and provides a synchronized revolution pulse.

With reference to FIG. 7, the signals developed as previously described are applied to the averaging circuit enclosed by dotted lines 1000. The circuitry within dotted enclosure 1000 corresponds to that of FIG. 2 and averaging of the optical density data for the cuvettes 9 is accomplished as described in connection with FIG. 2.

The aforedescribed centrifugal analyzer, is of the type described in "Analytical Biochemistry", 28, 545–562 (1969).

A frequently performed analytical test using centrifugal analyzers is the determination of glucose in blood serum. In this analysis, 5 microliters of serum is placed in the serum cavities and 350 microliters of glucose reagent is placed in the reagent cavities of sample disc 1. The glucose reagent is a 0.3 molar triethanolamine buffer of pH 7.5 containing 0.0004 Mol/liter NADP, 0.0005 Mol/liter ATP, 70mg/liter hexokinase, 140 mg/liter glucose–6–phosphate dehydro-genase and 0.004 mol/liter $MgSO_4$. The combined action of ATP (adenosine triphosphate) and NADP (nicotineamide adenine dinucleotide phosphate) in the presence of the enzymes hexokinase and glucose–6 phosphate dehydrogenase leads to the reduction of NADP which is followed spectrophotometrically by detecting changes in absorbance at a wavelength of 340 nm.

I claim:

1. A circuit for averaging a repeated sequence of a plurality of binary signals, the sequence being $2^n$ where n is one or more, said circuit comprising adding means to provide a summed output of binary signals applied thereto; means for transferring $2^n$ sequences of a plurality of binary signals serially to said adding means; serial storage means arranged to receive and accumulate the summed output of the adding means as binary data, the output of the serial storage means being applied as an input to the adding means, said serial storage means having a bit capacity such that upon receiving serially all the binary signals of a sequence a binary signal output is provided from the serial storage means corresponding to the initial binary signal of said sequence and applied to the adding means coincident with the initial binary signal of the next sequence; means for shifting the data in the serial storage means $n$ places after the binary signals of $2^n$ sequences have been accumulated in the serial storage means thereby averaging the accumulated data by $2^n$.

2. An apparatus for providing the average of a repeated sequence of a plurality of analog electrical signals corresponding to the light absorbance of a liquid medium which comprises, in combination, a light source; photodetector means spaced from and arranged in juxtaposition therewith, said photodetector means providing an analog electrical signal proportional to the light absorbance of the medium by which it is separated from said light source; a rotatably movable rotor means arranged to have a peripheral portion thereof rotate between said light source and said photodetector means, said rotor means having a plurality of light transmitting sample analysis chambers located at a common radial position in said rotor means and arranged to pass between said light source and said photodetector means upon rotation of the rotor means whereby a repeated sequence of a plurality of analog electrical signals is provided by the photodetector means proportional to the light absorbance of the contents of the analysis chambers, said sequence being $2^n$ where $n$ is one or more; means for converting the repeated sequence of analog electrical signals into a corresponding repeated sequence of a plurality of binary signals the sequence being $2^n$ where $n$ is one or more, each discrete binary signal having a value representative of the corresponding analog signal; adding means to provide a summed output of binary signals applied thereto; means for transferring $2^n$ sequences of said plurality of discrete binary signals serially to said adding means; serial storage means arranged to receive and accumulate the summed output of the adding means, as binary data, the output of the serial storage means being applied as an input to the adding means, said serial storage means having a bit capacity such that upon receiving serially all the binary signals of a sequence of binary signal output is provided from the serial storage means corresponding to the initial binary signal of said sequence and applied to the adding means coincident with the initial binary signal of the next sequence; means for shifting the data in the serial storage means $n$ places after the binary signals of $2^n$ sequences have been accumulated in the serial storage means thereby averaging the accumulated data by $2^n$; converting means for converting binary signals into binary coded decimal signals; means for applying the output of the serial storage means to said converting means; printer means adapted to receive said binary coded decimal signals and provide a display corresponding to the binary coded decimal signals; and means for applying the decimal coded signals from said converter means to said printer means.

* * * * *